United States Patent Office 2,949,262
Patented Aug. 16, 1960

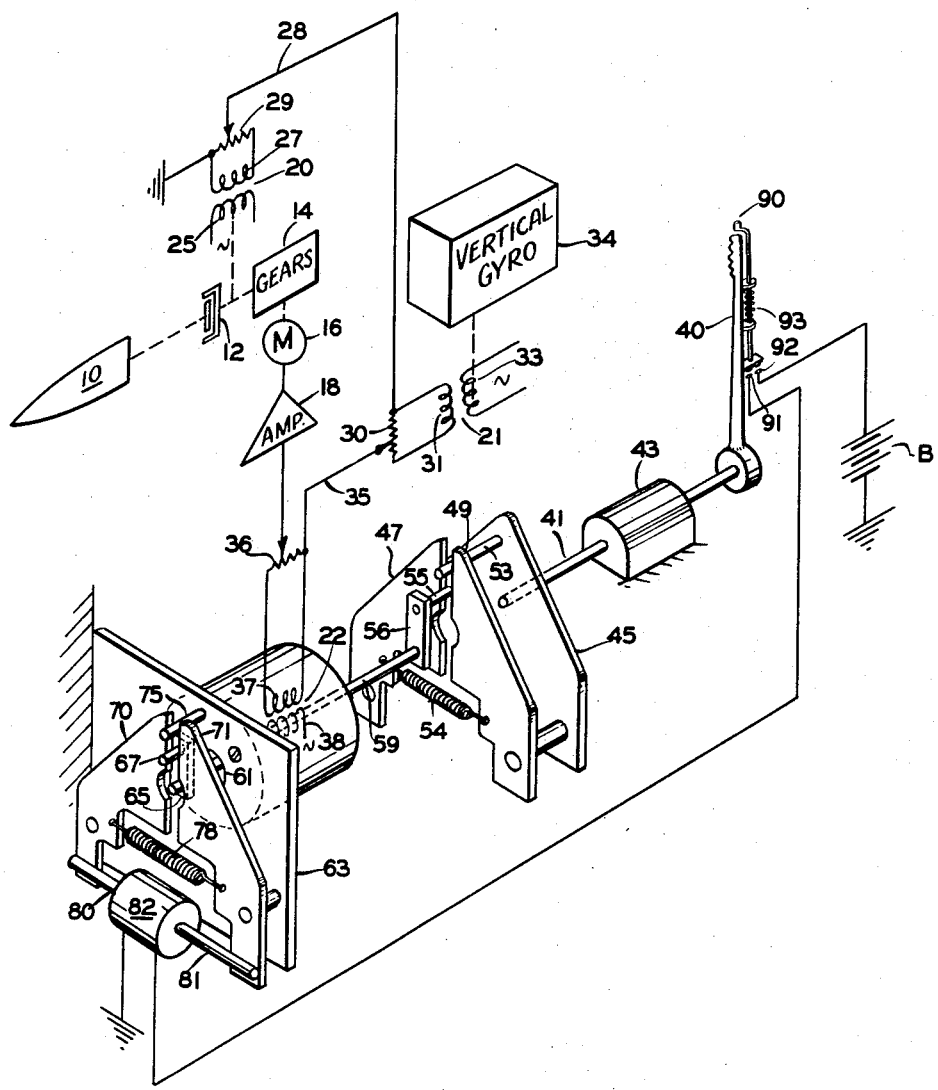

2,949,262

CONTROL SYSTEM FOR AIRCRAFT

Albert J. Newland, Glen Rock, N.J., assignor to Bendix Aviation Corporation, Teterboro, N.J., a corporation of Delaware Filed Mar. 1, 1956, Ser. No. 568,887

6 Claims. (Cl. 244—77)

This invention relates generally to control systems, and more particularly to a controller for an automatic control system for aircraft.

Conventional control systems for aircraft sense the deviation of the craft from a predetermined condition and apply a control action to the craft to correct for the deviation and are usually provided with a controller for changing the condition of the craft. While the operation of the controller conventionally causes a proportional deviation of the craft from the predetermined condition, it is desirable in some systems to change this proportional relationship in flight. Thus, the displacement of the controller and the deviation of the craft, for example, may have a 1:1 ratio for ordinary operation while for certain other specific operation the ratio may be changed so that displacement of the controller will provide only a small deviation of the craft from reference so as to give a substantial vernier control of the craft.

An object of the present invention, therefore, is to provide a novel controller for a control system with means for changing the extent of operation of the control system for a given extent of operation of the controller.

The present invention contemplates a novel aircraft control system having a controller which, when moved a given extent, provides for the operation of the control system to a proportional extent and which is provided with means for electrically changing the ratio of proportion of movement of the controller to operation of the control system.

The foregoing and other objects and advantages of the invention will appear more fully hereinafter from a consideration of the detailed description which follows, taken together with the accompanying drawing wherein one embodiment of the invention is illustrated. It is to be expressly understood, however, that the drawing is for the purposes of illustration and description, and is not to be construed as defining the limits of the invention.

The single sheet of drawing shows the novel controller of the present invention incorporated in one channel of an automatic control system for aircraft.

While a conventional automatic control system for aircraft generally controls the craft about each of its three axes, the controller is illustrated herein as embodied in the pitch control channel only of the aircraft for purposes of simplicity. The elevator surface 10 of the pitch control channel is connected by way of a suitable clutch 12 and gear train 14 to a power means or servomotor 16 which operates in response to the output of a conventional discriminator type amplifier 18. The signal chain to the amplifier includes a plurality of signal devices 20, 21 and 22.

By way of a suitable mechanical connection, motor 16 displaces the rotor 25 of inductive device 20 relative to stator 27 as the motor 16 operates the elevator surface to provide a follow-up signal at stator 27. A lead 28 transmits the signal from the potentiometer 29 connected across stator 27 to a potentiometer 30 connected across the stator 31 of the inductive device 21 whose rotor 33 is displaced by a conventional vertical gyro 34 when the craft deviates from a predetermined pitch attitude. A lead 35 transmits the signal combination from potentiometer 30 to a potentiometer 36 connected across stator 37 of inductive device 22, whose rotor 38 is displaceable by the novel controller means of the present invention.

With rotor 38 of inductive device 22 centered with respect to stator 37, the craft is maintained in a level pitch attitude. Any deviation from this attitude is detected by vertical gyro 34 which displaces rotor 33 of inductive device 21 relative to stator 31 to develop a signal for amplifier 18. The resulting output of amplifier 18 operates motor 16 in a direction to correct for the deviation until the displacement of rotor 25 of inductive device 20 develops at stator 27 a signal equal and opposite to the signal from inductive device 21. The net input to amplifier 18 at this time is zero and the motor stops with the surface displaced. As the displaced surface returns the craft to the predetermined attitude, the signal from inductive device 21 decreases and the signal from inductive device 20 prevails to return the surface to a streamlined position.

The attitude of the craft may be changed by novel controller means by rotating rotor 38 of inductive device 22 relative to stator 37. In accordance with the present invention, the displacement of a conventional stick controller 40 angularly from a normal position rotates a shaft 41 which is journaled in a suitable bearing 43 and which has a plate 45 fixed to its end. A pair of levers 47, 49 are rotatably mounted on plate 45 and are urged together against a pin 53 projecting from plate 45 by a resilient means or spring 54. A pin 55 interposed between levers 47 and 49 is fixed to a bracket 56 which, in turn, is fixed to a shaft 59 which carries the rotor 38 of inductive device 22. Shaft 59 projects through an opening 61 in a plate 63 and terminates in a bracket 65 having a pin 67 projecting therefrom. Pin 67 is interposed between two levers 70 and 71 which are rotatably mounted on plate 63 and which are urged together against a pin 75 projecting from plate 63 by a resilient means or spring 78. Connected to the ends of levers 70, 71 are respective cores 80, 81 of a suitable solenoid 82 which is mounted on plate 63. When the solenoid 82 is energized, it pulls members 80 and 81 inwardly to spread levers 70 and 71 against the bias of resilient means or spring 78. Depressing a button 90 on controller 40 bridges contacts 91 and 92 and completes a circuit from battery B through solenoid 82 to energize the solenoid. A spring 93 normally maintains the circuit in the operative position shown. Stator 37 of inductive device 22 and plate 63 are fixed to the craft in a suitable manner.

In one mode of operation, button 90 is depressed to energize solenoid 82. Thereafter, the displacement of stick 40 rotates shaft 41 and plate 45. Pin 53 bearing against lever 47 or 49 forces one lever dependent upon the direction of rotation to move with plate 45, and spring 54 urges the other lever to follow, thereby causing pin 55 and bracket 56 to rotate with the levers. The rotation of shaft 59 with bracket 56 displaces rotor 38 of inductive device 22 relative to stator 37. Since the energization of solenoid 82 spreads levers 70 and 71 so that the spring 78 does not oppose the movement of shaft 59, the displacement of stick 40 correspondingly displaces shaft 59 to develop at stator 37 a signal corresponding in phase and magnitude to the direction and extent of displacement of the shaft.

The signal from inductive device 22 is applied to amplifier 18 to operate servomotor 16 and displace surface 10 until the follow-up signal from inductive device 20 builds up to equal and oppose the signal from inductive device 22. As the displaced surface changes the pitch attitude of the craft, a signal at inductive device 21 builds up to equal and oppose the signal from inductive device 22. At this time the signal from follow-up device 20 prevails to operate servomotor 16 to return the surface to the streamlined attitude. The craft is now in a pitch attitude such that the signals from inductive devices 21 and 22 are equal and opposite and the net input to amplifier 18 is zero.

In the other mode of operation, button 90 is not depressed. The angular displacement of stick 40 rotates shaft 41 and plate 45. Pin 53 again displaces one lever, for example, lever 47, and spring 54 urges lever 49 to follow. However, as lever 49 tends to rotate shaft 59, the shaft displaces bracket 65 and pin 67 displaces lever 70. Since lever 71 is engaged with pin 75, this displacement of lever 70 is restrained by spring 78. If springs 54 and 78 be of equal strength, the rotation of shaft 41 will result in lever 47 being rotated correspondingly but in levers 49 and 70 being rotated only half the amount; i.e., springs 54 and 78 being stressed equal amounts. Thus, for a given movement of lever 40, only half that movement is imparted to shaft 59 and inductive device 22 when solenoid 82 is not energized.

The foregoing has presented a control system having a novel controller for operating a control surface of a craft to change the attitude of a craft about an axis. The amount of control imparted to the surface for a given movement of the controller may be changed by the operation of an electrical system.

Although but one embodiment of the invention has been illustrated and described, various changes can be made in the design and arrangement of the parts without departing from the spirit and scope of the invention, as the same will now be understood by those skilled in the art.

I claim:

1. In an aircraft control system, power means for moving a control surface of said craft, signal means actuable for developing a signal to operate said power means in a direction and to an extent corresponding to the sense and magnitude of said signal, controller means movable from a normal position, first resilient means operably connected with said controller means and said signal means and tending to actuate said signal means upon movement of said controller, second resilient means operably connected with said signal means and tending to resist actuation of said signal means, whereby said signal means is actuated to one extent upon a given movement of said controller, and means operable for rendering said second resilient means ineffective on said signal means, whereby said signal means may be actuated to a different extent upon said given movement of the controller.

2. In an aircraft control system, power means operable for moving a control surface of the craft, signal means having a part displaceable from a normal position for developing a signal corresponding to said displacement to operate said power means, a controller movable from a normal position, first resilient means connected between said controller and said signal means part, whereby movement of said controller tends to move said one part to develop a signal, second resilient means operably connected with said signal means part for resisting displacement of said part whereby said two resilient means oppose each other so that a given movement of said controller provides a predetermined displacement of said part, and electrically operable means for rendering said second resilient means ineffective to resist displacement of said second part, whereby said given movement of said controller provides a different displacement of said part.

3. An aircraft control system comprising first and second assemblies each including a plate having a projection, a pair of levers, and a resilient means connected on the levers, said levers being pivoted on said plate to straddle said projection and being urged against said projection by said resilient means, a connection between said assemblies including a rigid member having first and second arms each having a pin adapted to be engaged by a respective pair of said levers whereby each pair of levers normally engages a respective pin and projection, a controller for rotating the plate of said first assembly relative to the plate of said second assembly whereby in response to movement of said controller the projection of the plate of said first assembly rotates one lever of the first assembly and the resilient means of such first assembly constrains the other lever of the first assembly to rotate thereby rotating said first and second arms, the rotation of said second arm rotating one lever of the second assembly away from the projection thereon and thereby stressing the resilient means of the second assembly until the resilient means of both the first and second assemblies are stressed to a like degree whereby said rigid member is rotated at a predetermined ratio with respect to the relative rotation of said plates, signal means actuated by said member for developing a corresponding signal, power means operable by said signal for displacing a surface of said craft, and means for rendering one of said resilient means ineffective on said levers so as to change said ratio.

4. In a control system for an aircraft, power means for moving a control surface of the craft, reference means for detecting deviation of the craft from a predetermined attitude and operatively connected to said power means to correct for the deviation, a controller movable from a normal position, means operatively connecting said controller to said power means for changing the predetermined craft attitude by an amount proportional to the extent of movement of said controller, said connecting means including resilient means for changing the proportion of attitude change to controller movement, and electrically operable means for controlling the resilient means.

5. In a control system for an aircraft, power means for moving a control surface of the craft, reference means responsive to deviation of the craft from a predetermined attitude, first signal means actuated by said reference means and operatively connected to said power means to return the craft to the predetermined attitude, a controller movable from a normal position, second signal means operatively connected with the power means, and means operatively connecting the controller to the second signal means for developing a further signal upon movement of the controller to maintain the craft in an attitude other than the predetermined attitude, said connecting means including resilient means for changing the magnitude of the further signal for a given movement of the controller, and electrically operable means for controlling the resilient means.

6. In an aircraft control system, power means for moving a control surface of the craft, signal means operatively connected to the power means for developing a signal to operate the power means in a direction and to an extent corresponding to the sense and magnitude of the signal, a controller movable from a normal position, means including resilient means operatively connecting the controller to the signal means, and means for operating the resilient means to selectively change the extent of operation of the signal means for a given movement of the controller.

References Cited in the file of this patent

UNITED STATES PATENTS

| | | |
|---|---|---|
| 2,205,610 | Van Nes | June 25, 1940 |
| 2,582,305 | Young | Jan. 15, 1952 |
| 2,678,177 | Chenery et al. | May 11, 1954 |
| 2,760,739 | Reichert | Aug. 28, 1956 |